(12) United States Patent
He et al.

(10) Patent No.: US 10,793,678 B2
(45) Date of Patent: Oct. 6, 2020

(54) FILLERS FOR POLYMERS

(71) Applicants: AGENCY FOR SCIENCE, TECHNOLOGY AND RESEARCH, Singapore (SG); NATIONAL UNIVERSITY OF SINGAPORE, Singapore (SG)

(72) Inventors: Chaobin He, Singapore (SG); Warintorn Thitsartarn, Singapore (SG); Xiaoshan Fan, Singapore (SG); Yang Sun, Singapore (SG); Chee Chuan Jayven Yeo, Singapore (SG)

(73) Assignees: AGENCY FOR SCIENCE TECHNOLOGY AND RESEARCH, Singapore (SG); NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 15/544,875

(22) PCT Filed: Jan. 19, 2016

(86) PCT No.: PCT/SG2016/050019
§ 371 (c)(1),
(2) Date: Jul. 19, 2017

(87) PCT Pub. No.: WO2016/118081
PCT Pub. Date: Jul. 28, 2016

(65) Prior Publication Data
US 2018/0009952 A1    Jan. 11, 2018

(30) Foreign Application Priority Data
Jan. 19, 2015    (SG) .............................. 10201500401P

(51) Int. Cl.
C08G 77/38    (2006.01)
C08L 63/00    (2006.01)
C08K 3/36    (2006.01)

(52) U.S. Cl.
CPC ................. *C08G 77/38* (2013.01); *C08K 3/36* (2013.01); *C08L 63/00* (2013.01)

(58) Field of Classification Search
CPC ..................................................... C08G 77/38
See application file for complete search history.

(56) References Cited

U.S. PATENT DOCUMENTS

2009/0082524 A1*    3/2009  Tew ....................... C07C 229/14
                                                                525/55
2010/0061759 A1*    3/2010  Moriya ................ G03G 9/1133
                                                                399/111
(Continued)

FOREIGN PATENT DOCUMENTS

EP    2289712 A1    3/2011
EP    2607103 A2    6/2013

OTHER PUBLICATIONS

IP Office of Singapore; Notification of Transmittal of the International Search Report and the Written Opinion of the International Searching Authority, or the Declaration for counterpart International Application No. PCT/SG2016/050019 with the International Search Report and Written Opinion, 15 pgs. (dated Feb. 16, 2016).
(Continued)

*Primary Examiner* — Megan McCulley
(74) *Attorney, Agent, or Firm* — Womble Bond Dickinson (US) LLP

(57) ABSTRACT

This invention relates to a composite material comprising a core comprising an organosilica such as a polyhedral oligomeric silsesquioxane (POSS) and a functionalized elastomeric polymer such as poly(n-butyl acrylate) bonded onto said core. The elastomer is preferably functionalised with an
(Continued)

amine moiety. The present invention also relates to a polymer comprising a resin such as Bisphenol A diglycidylether (DGEBA) and the aforementioned composite material, and a method for making the composite material. The composite material can improve both the material strength and material toughness of the polymer into which it is mixed.

10 Claims, 6 Drawing Sheets

(56) References Cited

U.S. PATENT DOCUMENTS

| | | | | |
|---|---|---|---|---|
| 2010/0159376 | A1* | 6/2010 | Zhou | G03G 9/0804 430/108.3 |
| 2010/0270518 | A1* | 10/2010 | Lin | G02B 1/04 252/585 |
| 2011/0048599 | A1* | 3/2011 | Ryba | B60C 1/0016 152/209.5 |
| 2013/0071672 | A1* | 3/2013 | Li | B32B 27/08 428/447 |
| 2013/0165578 | A1* | 6/2013 | Francik | C08C 19/20 524/516 |
| 2013/0344325 | A1* | 12/2013 | Nguyen | B32B 5/10 428/343 |
| 2014/0272372 | A1* | 9/2014 | Li | C09D 1/00 428/221 |
| 2018/0088254 | A1* | 3/2018 | Kim | G02B 1/111 |

OTHER PUBLICATIONS

Choi, J. et al., Organic/Inorganic Hybrid Epoxy Nanocomposites from Aminophenylsilsesquioxanes. *Macromolecules*, Dec. 13, 2003, vol. 37, No. 1, pp. 99-109.

Chruściel, J. J. et al., Modification of Epoxy Resins with Functional Silanes, Polysiloxanes, Silsesquioxanes, Silica and Silicates. Prog. Polym. Sci., Aug. 23, 2014, vol. 41, pp. 67-121.

Kim, H-J. et al., Synthesis and Properties of Hydroxyl-Terminated Polybutadiene-Based Polyurethanes Reinforced with Polyhedral Oligomeric Silsesquioxanes. *J. Nanosci. Nanotechnol.*, Nov. 1, 2014, vol. 14, No. 11, pp. 8671-8677.

Loh, X. J. et al., Efficient Gene Delivery with Paclitaxel-Loaded DNA Hybrid 1-6, 11, 12, 19-23, 25-28 Polyplexes Based on Cationic Polyhedral Oligomeric Silsesquioxanes. *J. Mater. Chem.*, Oct. 4, 2010, vol. 20, pp. 10634-10642.

Thitsartarn, W. et al., Simultaneous Enhancement of Strength and Toughness of Epoxy Using Poss-Rubber core-Shell Nanoparticles. *Comp. Sci. Tech.*, Jun. 21, 2015, vol. 118, pp. 63-71.

Wang, F. et al., Some Recent Developments of Polyhedral Oligomeric Silsesquioxane (POSS)-based Polymeric Materials. *J. Mater. Chem.*, Dec. 1, 2010, vol. 21, pp. 2775-2782.

He et al., "Octafunctional cubic silsesquioxane (CSSQ)poly(methyl methacrylate) nanocomposites: Synthesis by atom transfer radical poymerization at mild conditions and the influence of CSSQ on nanocomposites", Journal of Polymer Science: Part A: polymer chemistry, Dec. 18, 2007 vol. 46, pp. 766-776.

* cited by examiner

[Fig. 1]
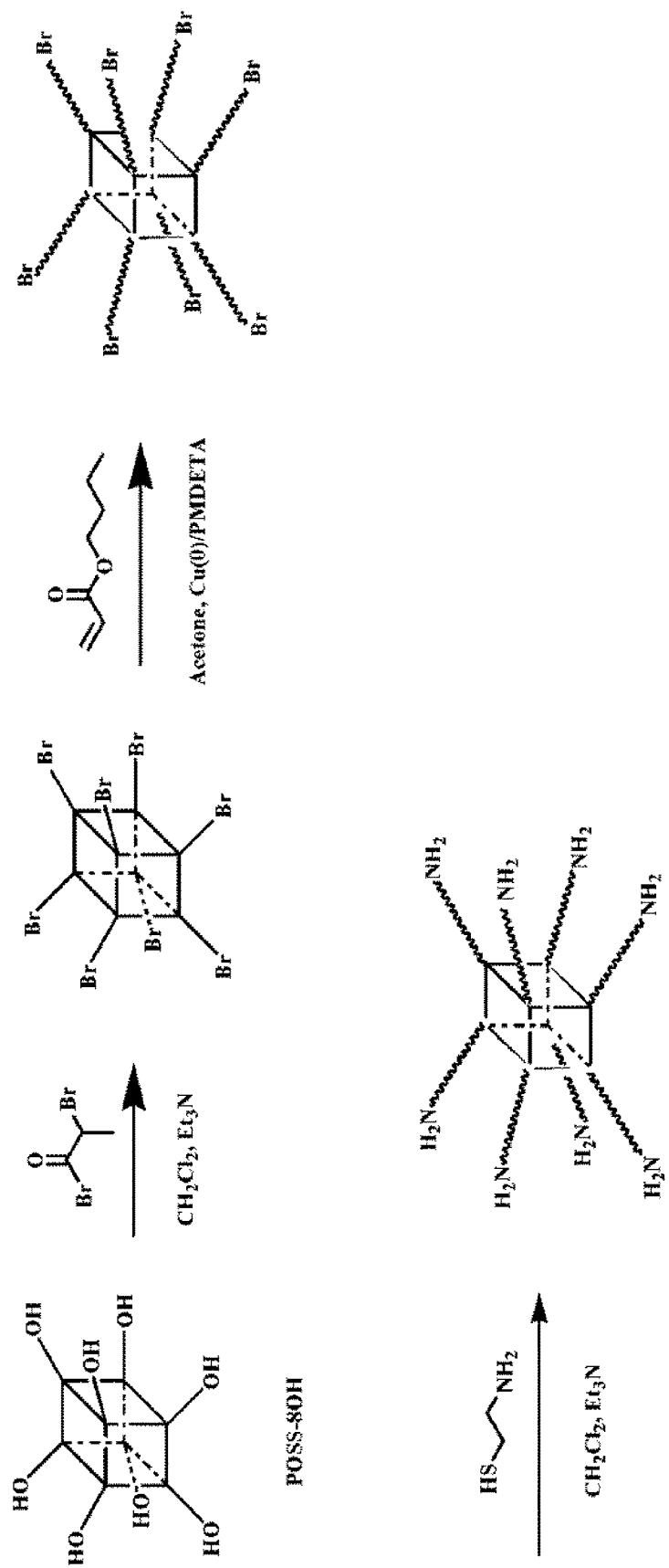

[Fig. 2]
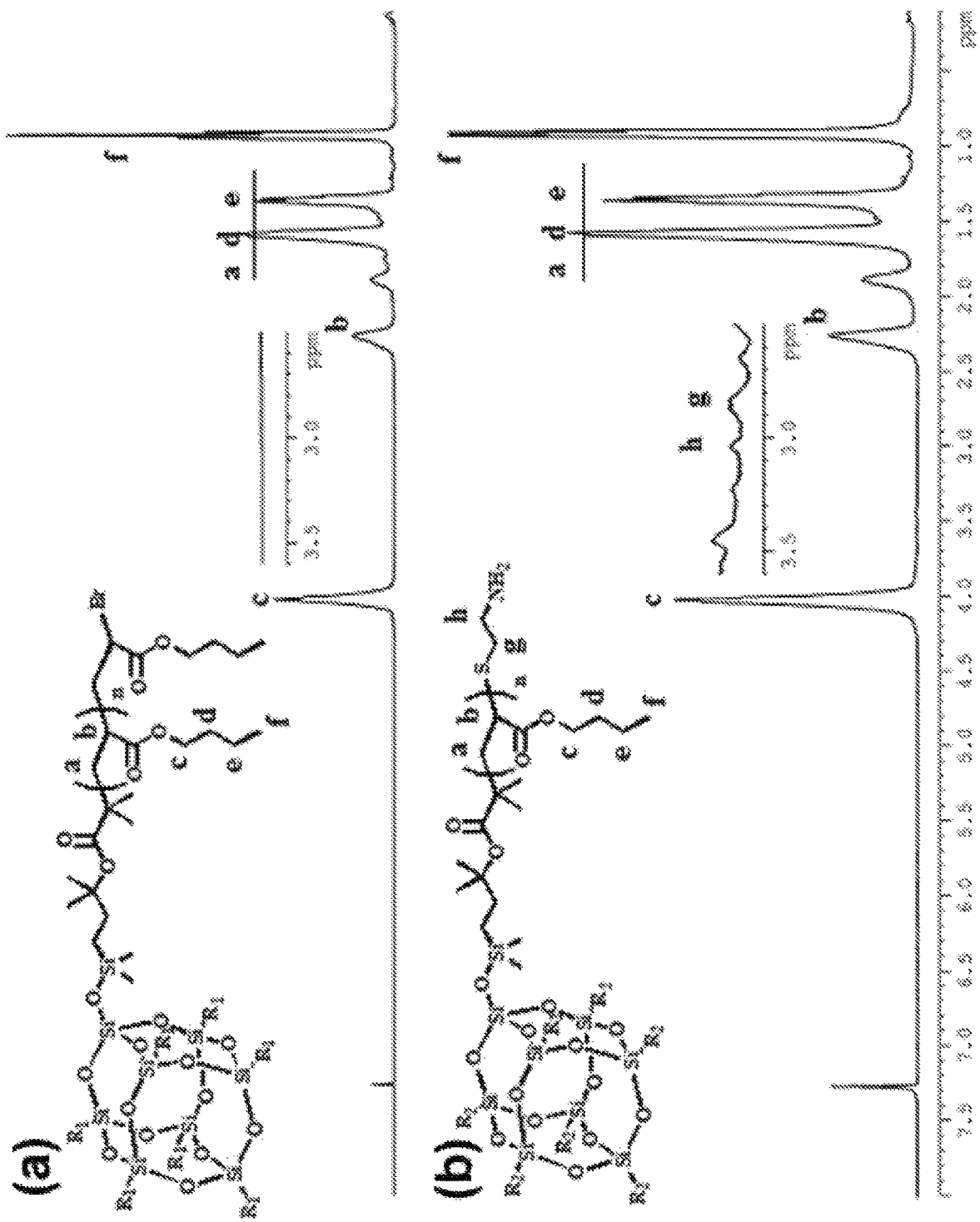

[Fig. 3]
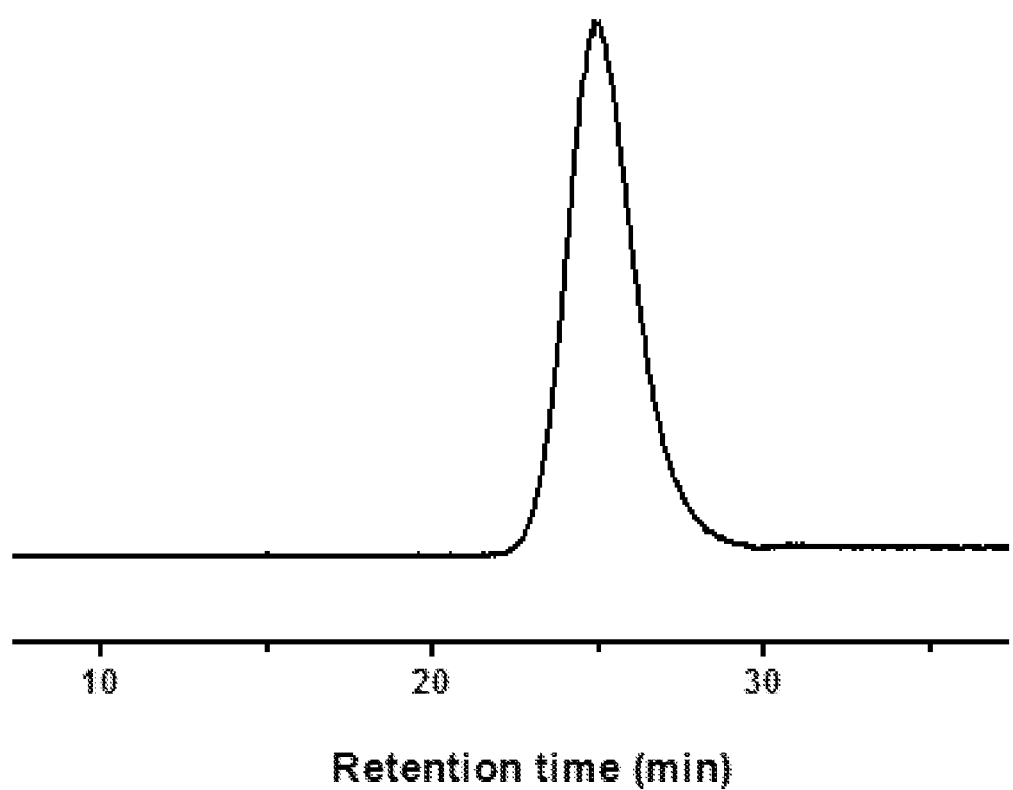

[Fig. 4]
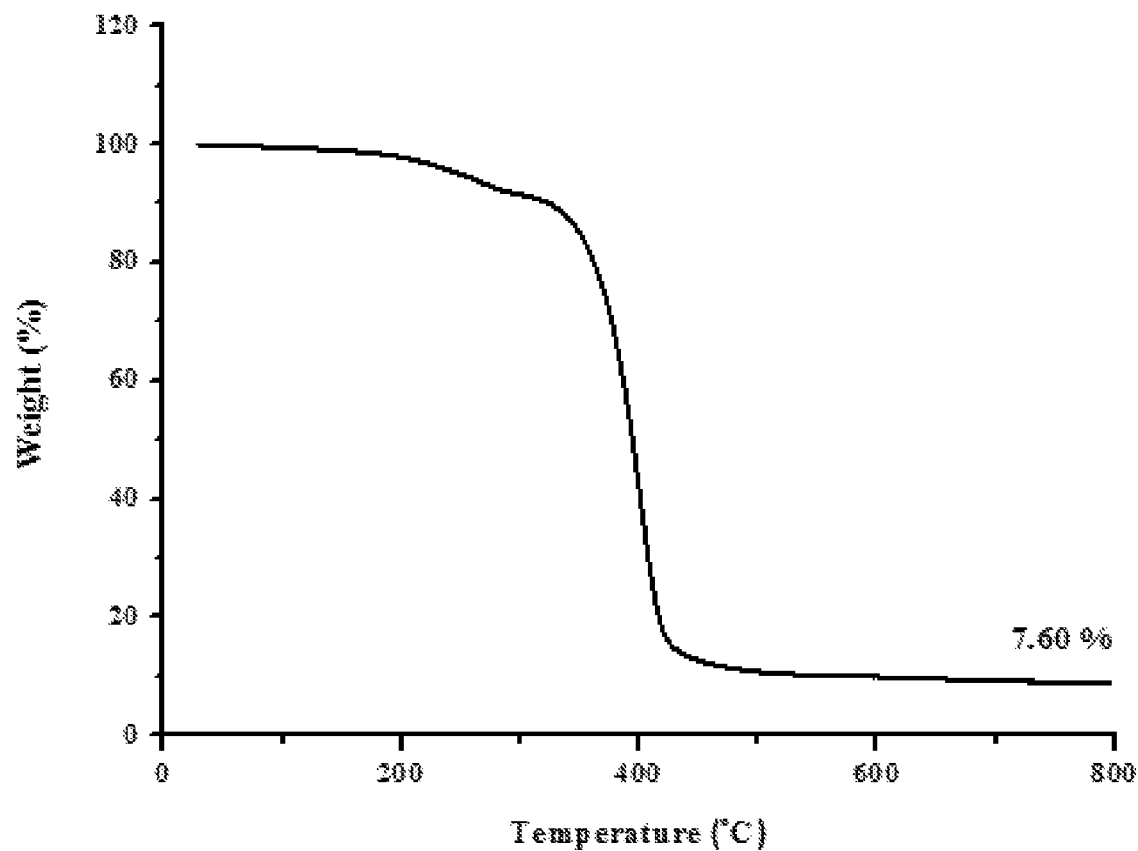

[Fig. 5]
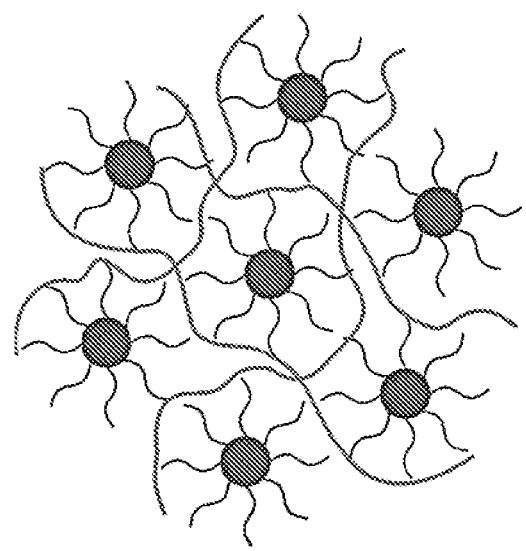
506
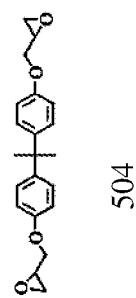
504
+
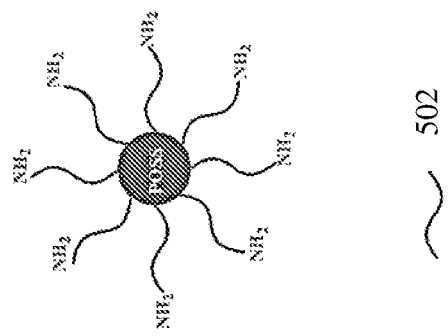
502

[Fig. 6]
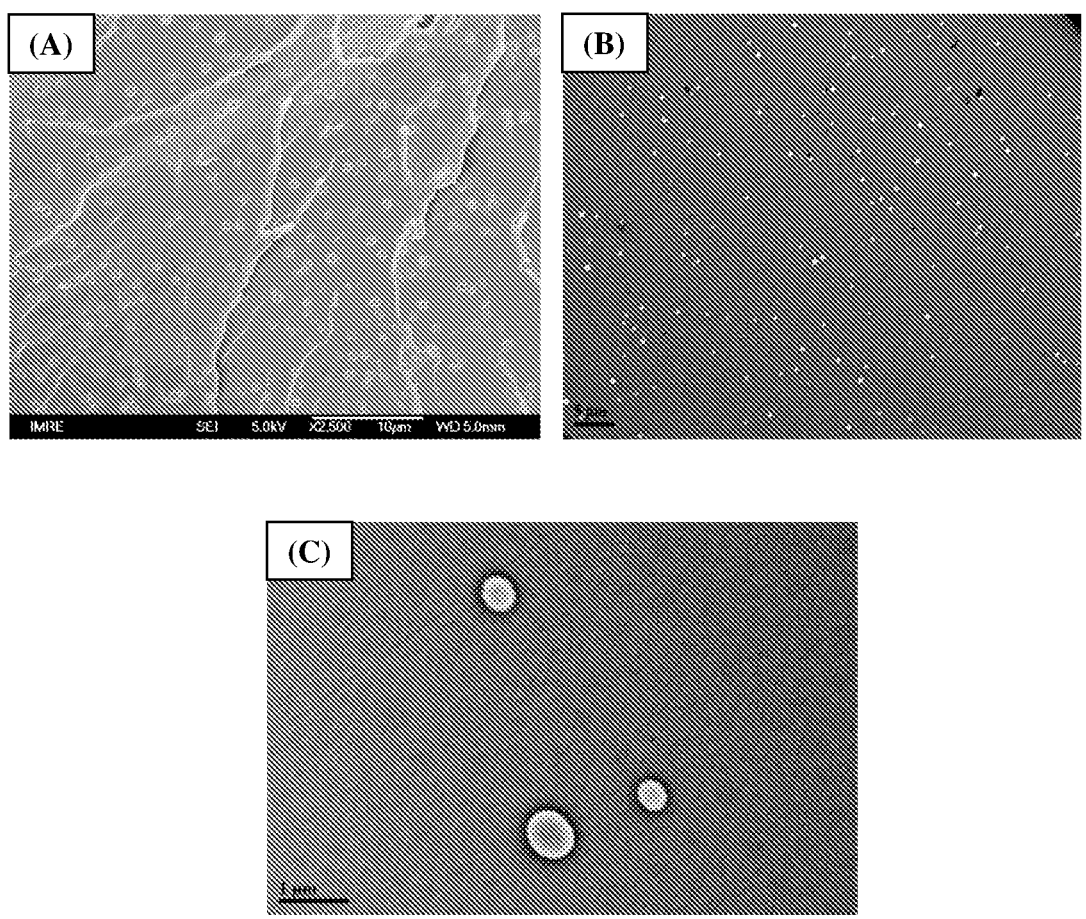

FILLERS FOR POLYMERS

CROSS-REFERENCE TO RELATED APPLICATIONS

This patent application is a U S National Phase application under 35 U.S.C. § 371 of International Application No. PCT/G2016/050019, filed on Jan. 19, 2016, entitled FILLERS FOR POLYMERS which claims priority from Singapore Patent Application No. 10201500401P, filed on Jan. 19, 2015.

TECHNICAL FIELD

The present invention relates to a composite material comprising a core and a functionalized elastomeric polymer. The present invention also relates to a polymer comprising a resin and the composite material, and the method for making the composite material.

BACKGROUND ART

Incorporation of composite materials such as nanofillers for the purposes of mechanical enhancement of a polymer matrix has been researched for decades. Incorporation of fillers can significantly increase some aspects of material strength, such as tensile properties. For instance, by adding a filler, a polymer may be able to withstand higher stress while being stretched or pulled before it breaks or fails, compared to when no filler is added.

However, addition of a filler has also been known to compromise material properties such as impact resistance, which results in the material being more brittle. This contradictory phenomenon has been a constant challenge for material researchers.

There is therefore a need to provide composite material such as a filler that overcomes or at least ameliorates, one or more of the disadvantages described above.

SUMMARY OF INVENTION

In an aspect, there is provided a composite material comprising a chalcogen core and a functionalized elastomeric polymer bonded onto the chalcogen core.

Advantageously, the composite material may concomitantly enhance properties such as tensile strength, tensile modulus, elongation at break, storage modulus, impact resistance and fracture toughness of polymer matrices into which they are mixed with. Advantageously, this enhancement may be due to the structural design of the composite material at the molecular level and the synergism between each of the components of the composite material. That is, between the core, the elastomeric polymer and the functional group of the elastomeric polymer. Advantageously, the composite material may comprise of three important parts, including the chalcogen core which acts as the rigid inner core, the elastomeric polymer which acts as a soft ductile segment that is firmly bonded onto the inner core, and a reactive functional group that terminates the elastomeric polymer. More advantageously, the chalcogen core may provide a firm backbone to the polymer, the elastomeric polymer may provide resilience to the polymer matrix and the reactive functional group may provide bonding of the composite material to the polymer matrix. Advantageously, the elastomeric polymer may confer not only enhancement in tensile properties to the polymer matrix but also enhancement in properties such as impact resistance. That is, the elastomeric polymer may reduce brittleness of the polymer matrix. Further advantageously, the composite material may have a uniform size and may be easily and uniformly dispersed in polymer matrices.

In another aspect, there is provided a polymer comprising a resin and the composite material as defined above. Advantageously, with as little as 1 wt % of the composite material in the polymer matrix, the material strength and material resilience may improve significantly. That is, the material may be able to withstand a larger amount of stress before failing, while at the same time, be able to absorb more energy and deform without fracturing compared to conventional materials.

In comparison to epoxy resin that does not contain any fillers, a polymer comprising the composite material as defined above may have an 80% increase in impact resistance, 20% increase in fracture toughness ($K_{ic}$), more than 100% increase in elongation at break and almost 50% increase in maximum tensile strength. Advantageously, the polymer may simultaneously have material strength and material resilience, unlike conventional polymer comprising a filler where material resilience may be compromised. In other words, a polymer material containing the disclosed composite material may exhibit tensile strength comparable or superior to other polymer materials containing conventional nanofillers, but without experiencing the brittleness that conventional nanofillers tend to cause.

Further advantageously, the composite material may be uniformly distributed within the polymer matrix. More advantageously, there may be a strong interaction between the composite material and the resin of the polymer.

In another aspect, there is provided a method of synthesizing the composite material as defined above, comprising the steps of: providing a chalcogen core; activating the core; contacting the activated core with an elastomeric polymer; and functionalizing the elastomeric polymer with a reactive functional group.

Advantageously, the method may provide a time- and cost-effective way for manufacturing the composite material. More advantageously, the method may be easily up-scaled. Further advantageously, the simple preparation process may allow easy integration of the method as defined above with existing industrial processes.

Definitions

The following words and terms used herein shall have the meaning indicated:

The term "filler" refers to particles that are added to matrices such as polymer matrices to lower the consumption of more expensive binder material or to better the properties of the matrix. For the purposes of this disclosure, the term "filler" includes reference to the terms "nanofillers", "nanocomposite fillers" and "composite material".

The term "chalcogen" refers to chemical elements in group 16 of the periodic table, consisting of the elements oxygen (O), sulfur (S), selenium (Se), tellurium (Te), and polonium (Po).

The term "polyhedral oligomeric silsesquioxane" may be used interchangeably with its abbreviation, "POSS", and refers to an organosilicon compound with the chemical formula, $[RSiO_{3/2}]_n$, where R is H, alkyl, aryl or alkoxyl. Silsesquioxanes may have a molecular form with 6, 8, 10 and 12 Si vertices, as well as a polymer form. Each Si centre is bonded to three oxo groups, which in turn connect to other Si centres.

The term "elastomer" refers to a polymer that has both viscosity and elasticity. Elastomers are amorphous polymers existing above their glass transition temperature, so that segmental motion is possible.

The term "reactive functional group", for the purposes of this disclosure, refers to any functional group that is capable of forming a covalent bond with another functional group. In the context of the present disclosure, the reactive functional group provided on the elastomer may be one that is capable of forming crosslinks with a functional group of the polymer matrix to which the chalcogen composite has been added. In other embodiments, the reactive functional group may be capable of reacting with cross-linker compounds that are mixed with the resin.

The term "material strength" refers to the resistance of a material to failure, given by the applied stress (or load per unit area), or the stress/load level of a material when a significant change in the state of the material is observed.

The term "material toughness" refers to the ability of a material to absorb energy measures the energy required to crack a material. In other words, it is the ability of a material to absorb energy and deform without fracturing. Material toughness may be an important measure for materials that suffer impact.

The term "maximum tensile strength", for the purposes of this disclosure, refers to the maximum tensile stress a material can withstand while being stretched or pulled before failing or breaking. Tensile strength is measured in MPa.

The term "tensile modulus", for the purposes of this disclosure, refers to the stress (force per unit area) along an axis to the strain (ratio of deformation over initial length) along the axis in the range of stress in which Hooke's law holds.

The term "elongation at break", for the purposes of this disclosure, can be used interchangeably with the term "fracture strain", and refers to length at breaking point expressed as a percentage of its original length (i.e. length at rest).

The term "storage modulus", for the purposes of this disclosure, refers to the stored energy, representing the elastic portion of the material.

The term "impact resistance", for the purposes of this disclosure, can be used interchangeably with the term "impact strength", and refers to the ability of a material to withstand a high force or shock applied to it over a short period of time.

The term "fracture toughness", for the purposes of this disclosure, refers to the ability of a material containing a crack, to resist fracture.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Exemplary, non-limiting embodiments of a polymer matrix will now be disclosed.

A composite material may comprise a chalcogen core and a functionalized elastomeric polymer bonded onto the chalcogen core.

The chalcogen core may comprise an element selected from the group consisting of oxygen (O), sulfur (S), selenium (Se), tellurium (Te), and polonium (Po). The chalcogen core may comprise oxygen (O).

The chalcogen core may be any metal or non-metal oxide that has surface active functional groups capable of surface modification. The surface active functional groups may be selected from the group consisting of —OH, —COOH, ═O and any mixture thereof.

The chalcogen core may comprise a composition selected from the group consisting of organosilica, silica, clay, graphene oxide, carbon nanotubes, carbon black, glass fibres and any mixture thereof.

The chalcogen core may comprise organosilica. The organosilica may be polyhedral oligomeric silsesquioxane (POSS).

Polyhedral oligomeric silsesquioxane (POSS) may have the chemical formula $[RSiO_{3/2}]_n$, where R is H, alkyl, aryl or alkoxyl. Silsesquioxanes may have a molecular form with 6, 8, 10 and 12 Si vertices, as well as a polymer form. Each Si centre is bonded to three oxo groups, which in turn connect to other Si centres.

The polyhedral oligomeric silsesquioxane (POSS) may be an octahedral oligomeric silsesquioxane.

Octahedral oligomeric silsesquioxane may have the formula $[RSiO_{3/2}]_8$, or equivalently $R_8Si_8O_{12}$.

The functionalized elastomeric polymer of the composite material may be covalently bonded onto the chalcogen core.

The elastomeric polymer may be a thermoset elastomer or a thermoplastic elastomer. The elastomeric polymer may be a copolymer or a physical mix of polymers which consist of materials with both thermoplastic and elastomeric properties or both thermoset and elastomeric properties.

The elastomeric polymer may be a styrenic block copolymer, thermoplastic olefin, elastomeric alloy, thermoplastic polyurethane, thermoplastic copolyester or thermoplastic polyamide.

The elastomeric polymer may be selected from the group consisting of poly(n-butylacrylate), polysiloxane, polyisoprene, polybutadiene, polychloroprene, polyisobutylene, polyacrylate, polyvinyl, polyvinylidine and any mixture thereof. The elastomeric polymer may be poly(n-butylacrylate).

The molecular weight of the elastomeric polymer may be controllable via the polymerization process. The elastomeric polymer may have a molecular weight in the range of about 15,000 to about 30,000, about 15,000 to about 20,000, about 15,000 to about 25,000, about 20,000 to about 25,000, about 20,000 to about 30,000 or about 25,000 to about 30,000.

The elastomeric polymer may be a polymer that has a glass transition temperature below operational temperature. The operational temperature may be the temperature at which the resultant composite material and/or polymer may be used.

The elastomeric polymer may be a polymer that has a glass transition temperature below about −100° C., about −90° C., about −80° C., about −70° C., about −60° C., about −50° C., about −40° C., about −30° C., about −20° C., about −10° C., about 0° C., about 10° C. or about 20° C. The elastomeric polymer may be a polymer that has a glass transition temperature below −30° C.

The functionalized elastomeric polymer may comprise any functional group that may interact with a functional group of a polymer matrix. The interaction may be cross-linking by covalent bonds.

The elastomeric polymer may be functionalized with a functional group selected from the group consisting of amine, epoxy, ester, hydroxyl, vinyl, urethane, isocyanate and any mixture thereof. The elastomeric polymer may be functionalized with amine.

Each chalcogen core particle may be chemically bound to one or more functionalized polymeric tails. Each polymeric tail may be aliphatic and optionally substituted with one or more functional groups. Each polymeric tail may comprise a limited number of monomer units, i.e., each tail may be an oligomer having at least one terminal end covalently bound to the chalcogen core. Each polymeric tail may comprise one or more free, unreacted functional groups selected to be reactive with a polymer resin. Each polymeric or oligomeric tail may be optionally terminated with a reactive functional group.

Further disclosed herein is a polymer composition comprising a resin and the composite material as defined above.

The composite material may be present in the polymer in an amount of up to about 40 wt %, up to about 30%, up to about 20 wt %, up to about 10 wt %, up to about 5 wt %, up to about 2 wt %, up to about 1 wt % or up to about 0.05 wt %. The composite material may be present in the polymer in an amount of up to 5 wt %.

The composite material may be present in the polymer in an amount in the range of about 0.1 wt % to about 15 wt %, about 0.1 wt % to about 0.2 wt %, about 0.1 wt % to about 0.5 wt %, about 0.1 wt % to about 1 wt %, about 0.1 wt % to about 2 wt %, about 0.1 wt % to about 5 wt %, about 0.1 wt % to about 10 wt %, about 0.2 wt % to about 0.5 wt %, about 0.2 wt % to about 1 wt %, about 0.2 wt % to about 2 wt %, about 0.2 wt % to about 5 wt %, about 0.2 wt % to about 10 wt %, about 0.2 wt % to about 15 wt %, about 0.5 wt % to about 1 wt %, about 0.5 wt % to about 2 wt %, about 0.5 wt % to about 5%, about 0.5 wt % to about 10 wt %, about 1 wt % to about 15 wt %, about 1 wt % to about 2 wt %, about 1 wt % to about 5 wt %, about 1 wt % to about 10 wt %, about 1 wt % to about 15 wt %, about 2 wt % to about 5 wt %, about 2 wt %, about 2 wt % to about 10 wt %, about 2 wt % to about 15 wt %, about 5 wt % to about 10 wt %, or about 5 wt % to about 15 wt %.

The composite material may be present in the polymer in an amount in the range of about 0.5 wt % to about 2 wt %. The composite material may be present in the polymer in an amount in the range of about 1 wt % to about 10 wt %.

The resin may be any polymerizable polymer.

The resin may comprise polymerizable groups selected from the group consisting of amine, epoxy, ester, hydroxyl, vinyl, urethane, isocyanate and any mixture thereof.

The resin may comprise epoxy groups. The resin may be an epoxy resin. The epoxy resin may be low molecular weight pre-polymer or high molecular weight polymer which contains at least two epoxy groups.

The resin may be bisphenol A diglycidylether.

Bisphenol A digylcidylether may have the IUPAC name 2-[[4-[2-[4-(Oxiran-2-ylmethoxy)phenyl]propan-2-yl]phenoxy]methyl]oxirane, having the chemical formula $C_{21}H_{24}O_4$.

The composite material may be cross-linked with the resin. The composite material may be cross-linked with each other. The resin may be cross-linked with each other. The functional group of the elastomeric polymer may form cross-links with the resin. The functional group of the elastomeric polymer may form cross-links with each other.

The polymer may comprise a plurality of polymer chains being cross-linked by the composite material. The polymer may comprise a plurality of polymer chains being cross-linked with each other. The polymer may comprise a plurality of polymer chains being cross-linked by the functional group of the elastomeric polymer.

The cross-linking may be via covalent bonds.

The polymer may further comprise additives selected from the group comprising of hardener, antimicrobials, biostabilizers, antioxidants, antistatic agents, biodegradable plasticizers, blowing agents, external lubricants, flame retardants, fragrances, heat stabilizers, internal lubricants, light stabilizers, pigments and plasticisers.

The polymer may be cured at cured at a temperature in the range of about 100° C. to about 300° C., about 100° C. to about 120° C., about 100° C. to about 140° C., about 100° C. to about 160° C., about 100° C. to about 180° C., about 100° C. to about 200° C., about 100° C. to about 220° C., about 100° C. to about 240° C., about 100° C. to about 260° C., about 100° C. to about 280° C., about 120° C. to about 140° C., about 120° C. to about 160° C., about 120° C. to about 180° C., about 120° C. to about 200° C., about 120° C. to about 220° C., about 120° C. to about 240° C., about 120° C. to about 260° C., about 120° C. to about 280° C., about 120° C. to about 300° C., about 140° C. to about 160° C., about 140° C. to about 180° C., about 140° C. to about 200° C., about 140° C. to about 220° C., about 140° C. to about 240° C., about 140° C. to about 260° C., about 140° C. to about 280° C., about 140° C. to about 300° C., about 160° C. to about 180° C., about 160° C. to about 200° C., about 160° C. to about 220° C., about 160° C. to about 240° C., about 160° C. to about 260° C., about 160° C. to about 280° C., about 160° C. to about 300° C., about 180° C. to about 200° C., about 180° C. to about 220° C., about 180° C. to about 240° C., about 180° C. to about 260° C., about 180° C. to about 280° C., about 180° C. to about 300° C., about 200° C. to about 220° C., about 200° C. to about 240° C., about 200° C. to about 260° C., about 200° C. to about 280° C., about 200° C. to about 300° C., about 220° C. to about 240° C., about 220° C. to about 260° C., about 220° C. to about 280° C., about 220° C. to about 300° C., about 240° C. to about 260° C., about 240° C. to about 280° C., about 240° C. to about 300° C., about 260° C. to about 280° C., about 260° C. to about 300° C. or about 280° C. to about 300° C.

The polymer may be cured at a temperature in the range of about 130° C., about 160° C. or about 230° C.

The polymer may be cured for a duration in the range of about 1 hour to about 7 hours, about 1 hour to about 2 hours, about 1 hour to about 3 hours, about 1 hour to about 4 hours, about 1 hour to about 4 hours, about 1 hour to about 5 hours, about 1 hour to about 6 hours, about 2 hours to about 3 hours, about 2 hours to about 4 hours, about 2 hours to about 5 hours, about 2 hours to about 6 hours, about 2 hours to about 7 hours, about 3 hours to about 4 hours, about 3 hours to about 5 hours, about 3 hours to about 6 hours, about 3 hours to about 7 hours, about 4 hours to about 5 hours, about 5 hours to about 6 hours, about 5 hours to about 7 hours or about 6 hours to about 7 hours.

The polymer may be cured for a duration of about 2 hours or about 5 hours.

The polymer may be cured at any combination of temperature and duration as described above.

The polymer may be cured at any combination of temperature and duration as described above, but the curing temperature may not be higher than the degradation temperature of the elastomeric polymer.

Another embodiment relates to a method of synthesizing the composite material as defined above, comprising the steps of: providing a chalcogen core; activating the core; contacting the activated core with an elastomeric polymer; and functionalizing the elastomeric polymer with a reactive functional group.

The chalcogen core may comprise an element selected from the group consisting of oxygen (O), sulfur (S), selenium (Se), tellurium (Te), and polonium (Po). The chalcogen core may comprise oxygen (O).

The chalcogen core may be any metal or non-metal oxide that has surface active functional groups capable of surface modification. The surface active functional groups may be selected from the group consisting of —OH, —COOH, =O and any mixture thereof.

The chalcogen core may comprise a composition selected from the group consisting of organosilica, silica, clay, graphene oxide, carbon nanotubes, carbon black, glass fibres and any mixture thereof.

The chalcogen core may comprise organosilica. The organosilica may be polyhedral oligomeric silsesquioxane (POSS).

Polyhedral oligomeric silsesquioxane (POSS) may have the chemical formula $[RSiO_{3/2}]_n$, where R is H, alkyl, aryl or alkoxyl. Silsesquioxanes may have a molecular form with 6, 8, 10 and 12 Si vertices, as well as a polymer form. Each Si centre is bonded to three oxo groups, which in turn connect to other Si centres.

The polyhedral oligomeric silsesquioxane (POSS) may be an octahedral oligomeric silsesquioxane.

The octahedral oligomeric silsesquioxane may have the formula $[RSiO_{3/2}]_8$, or equivalently $R_8Si_8O_{12}$.

The polyoctahedral silsesquioxane may be octa(3-hydroxy-3-methylbutyldimethylsiloxy)-POSS.

The activating step may be performed by converting the hydroxyl group of octahydroxy polyoctahedral silsesquioxane to a bromo group. The activating step may be performed by reacting octahydroxy octahedral oligomeric silsesquioxane with 2-bromopropionyl bromide. The activated core may be octabromopropionyl polyoctahedral silsesquioxane.

The elastomeric polymer may be a thermoset elastomer or a thermoplastic elastomer. The elastomeric polymer may be a copolymer or a physical mix of polymers which consist of materials with both thermoplastic and elastomeric properties or both thermoset and elastomeric properties.

The elastomeric polymer may be a styrenic block copolymer, thermoplastic olefin, elastomeric alloy, thermoplastic polyurethane, thermoplastic copolyester or thermoplastic polyamide.

The elastomeric polymer may be selected from the group consisting of poly(n-butylacrylate), polysiloxane, polyisoprene, polybutadiene, polychloroprene, polyisobutylene, polyacrylate, polyvinyl, polyvinylidine and any mixture thereof. The elastomeric polymer may be poly(n-butylacrylate).

The elastomeric polymer may be a polymer that has a glass transition temperature below about −100° C., about −90° C., about −80° C., about −70° C., about −60° C., about −50° C., about −40° C., about −30° C., about −20° C., about −10° C., about 0° C., about 10° C. or about 20° C. The elastomeric polymer may be a polymer that has a glass transition temperature below −30° C.

The polymer may be cured at any combination of temperature and duration as described above, but the curing temperature may not be higher than the degradation temperature of the elastomeric polymer.

The elastomeric polymer may be functionalized with a functional group selected from the group consisting of amine, epoxy, ester, hydroxyl, vinyl, urethane, isocyanate and any mixture thereof. The elastomeric polymer may be functionalized with amine.

The contacting step may be performed in the presence of a base. The base may selected from the group consisting of triethylamine, diethylamine, N, N-diisopropylethylamine and any mixture thereof.

The contacting step may form a covalent bond between the activated core and the elastomeric polymer.

The reactive functional group may be selected from the group consisting of amine, epoxy, ester, hydroxyl, vinyl, urethane, isocyanate and any mixture thereof. The elastomeric polymer may be functionalized with amine.

The functionalizing step may be performed by contacting the elastomeric polymer with an amino-containing compound. The amino-containing compound may be cysteamine.

The present disclosure further relates to a method of improving the impact resistance of a polymer resin, the method comprising a step of adding an effective amount of a composite material as disclosed herein to a polymer resin composition; and optionally curing the polymer resin composition.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic showing the synthetic route of the POSS-(PnBA-NH$_2$)$_8$.

FIG. 2 is a $^1$H NMR spectra of (a) POSS-(PnBA-Br)$_8$ and (b) POSS-(PnBA-NH$_2$)$_8$ in CDCl$_3$.

FIG. 3 is the Gel Permeation Chromatography (GPC) trace of POSS-(PnBA-Br)$_8$ with THF as eluent.

FIG. 4 is a graph showing the thermogravimetric analysis (TGA) cure of POSS-(PnBA-NH$_2$)$_8$.

FIG. 5 is the proposed reaction mechanism for filler dispersion in an epoxy polymer matrix.

FIG. 6 refers to a FESEM image (A) and TEM micro images having a scale bar representing 5 μm (B) and 1 μm (C), showing the dispersion of the filler in epoxy polymer matrix (at 2 wt % loading) having uniform size (≤1 (μm).

EXAMPLES

Non-limiting examples of the invention and a comparative example will be further described in greater detail by reference to specific Examples, which should not be construed as in any way limiting the scope of the invention.

Example 1

Composite Material n-Butyl acrylate (n-BA) (≥99%, Aldrich) was purified by passing through a short column with neutral alumina oxide just before use to remove the inhibitor. Octa(3-hydroxy-3-methylbutyldimethylsiloxy)-POSS was purchased from Hybrid Plastics. 2-Bromoisobutyryl bromide (98%, Aldrich) and cysteamine (~95%, Aldrich) were used as received. Diglycidyl ether of bisphenol A epoxy resin (DGEBA, D.E.R. 332) from Dow Chemicals and Diethyltoluenediamine (Ethacure 100-LC) hardener from Albemarle were used as the polymer matrix. The ethanol (laboratory grade) was supplied from Merck.

Synthesis of POSS-Br$_8$

POSS-Br$_8$ was synthesized according to the procedure in He et al., Journal of Polymer Science: Part A: polymer chemistry Vol 46, 766-776 (2008). The characterization for it may be referred to this reference. In particular, POSS-OH$_8$ (3.508 g, 2.05 mmol), triethylamine (3.20 mL, 23.00 mmol) and dried THF (70 mL) were added to a two-neck round-bottom flask under nitrogen atmosphere. After the mixture was cooled to 0° C. in an ice-water bath, 2-bromopropionyl bromide (2.69 mL, 23.00 mmol) was added dropwise to the mixture. The reaction mixture was stirred for 1 h at 0° C., then was further stirred overnight at room temperature. THF was evaporated under reduced pressure. The residue was dissolved in CH$_2$Cl$_2$, and the organic phase was successively washed with saturated NaCl aqueous solution and deionized water. The organic phase was dried by anhydrous MgSO$_4$, followed by concentration. The crude product was purified by silica gel chromatography (first hexane, then THF) to provide the product as an extremely viscous light yellow oil (67% yield).

Synthesis of POSS-(PnBA-Br)$_8$

POSS-(PnBA-Br)$_8$ was synthesized via single-electron-transfer living-radical-polymerization (SET-LRP) as shown in FIG. 1. POSS-Br$_8$ (0.577 g, 0.21 mmol), n-butyl acrylate (20 mL), N,N,N',N',N"-pentamethyldiethylenetriamine (PMDETA) (0.35 mL, 1.03 mmol) and acetone (10 mL) were added to a Schlenk flask with a rubber stopper. The reaction system was degassed by purging nitrogen flow for 15 min before adding nano copper powder (0.026 g, 0.41 mmol). The flask was purged for another 5 min and sealed under nitrogen atmosphere. The polymerization lasted for 1.5 h at 30° C., then was stopped by diluting with THF. The solution was passed through a short alumina column to remove the copper compound. After removal of most of solvent on rotary evaporator, the residue was precipitated in an excess mixture of methanol/water (v:v 1:1). The product was dried under vacuum until constant weight. (M$_{n,NMR}$=22,480 g/mol) (46% yield). POSS-(PnBA-Br)$_8$ was characterized by $^1$H nuclear magnetic resonance ($^1$H NMR) and Gel permeation chromatographic (GPC) equipments. The $^1$H NMR spectrum is shown in FIG. 2a and the GPC spectrum is shown in FIG. 3.

Synthesis of POSS-(PnBA-NH$_2$)$_8$

POSS-(PnBA-NH$_2$)$_8$ was synthesized via thio-bromo "Click" reaction (as shown in FIG. 1). POSS-(PnBA-Br)$_8$ (3.50 g, 0.156 mmol), triethylamine (0.19 mL, 1.37 mmol) and cysteamine (0.105 g, 1.36 mmol) were dissolved in THF (20 mL). The reaction mixture was stirred overnight at room temperature, then concentrated under reduced pressure. The residue was precipitated in excess mixture of methanol/water (v:v 1:1) to obtain the product POSS-(PnBA-NH$_2$)$_8$ (93% yield). POSS-(PnBA-NH$_2$)$_8$ was characterized using $^1$H NMR (FIG. 2b) and thermogravimetric analysis (TGA) (FIG. 4). As compared with the $^1$H NMR spectrum of POSS-(PnBA-Br)$_8$ (FIG. 2a), the methane protons (—SC$\underline{H}_2$CH$_2$NH$_2$) and methane protons (—SCH$_2$C$\underline{H}_2$NH$_2$) of cysteamine can be seen more clearly (FIG. 2b), demonstrating successful modification of POSS-(PnBA-Br)$_8$ by amine groups. In the thermogravimetric analysis (TGA) cure of the POSS-(PnBA-NH$_2$)$_8$ filler (FIG. 4), the decomposition stage ranging from about 265° C. to 430° C. could be ascribed to the polymer of n-butylacrylate. The weight fractions of the rubber poly(n-butylacrylate) and POSS are approximately 92.40% and 7.60%, respectively, which are consistent with the theoretical values (92.33% and 7.67%).

Example 2

POSS-Rub/Epoxy

POSS-(PnBA-NH$_2$)$_8$ was dispersed in ethanol and sonicated for 30 min to improve its dispersion in the solvent medium. After that, epoxy resin (Epoxy D.E.R. 332) was mixed with the filler solution and the mixture was homogenized for 30 min. The solvent was removed at 75° C. under vacuum condition after homogenization. After the solvent is completely removed, a hardener (Ethacure 100-LC from Albemarle) was homogeneously mixed with the mixture at a weight ratio of 61 g of epoxy resin to 16 g of hardener. After that, the mixture was degassed under vacuum at 40° C. for 2 h, and poured into a glass mould. Then, the mixture was cured at 130° C. for 2 h, 160 for 2 h and 230° C. for 5 h. This sample is denoted as POSS-Rub/Epoxy. This process is shown in FIG. 5, where 502 denotes the elastomeric polymer poly(n-butylethylene), 504 denotes the epoxy resin and 506 denotes heating. FIG. 6 shows the morphology of the filler in the polymer matrix and the filler dispersion. As can be seen from FIG. 6, POSS-(PnBA-NH$_2$)$_8$ dispersed in the polymer matrix has a uniform size (less than 1 micron) within the matrix.

Comparative Example 1

Neat DER 332

Epoxy resin (Epoxy D.E.R. 332 from Dow Chemicals) was mixed with hardener (Ethacure 100-LC from Albemarle) and the mixture was homogenized for 30 min. The weight ratio is 61 g of resin to 16 g of hardener, according to the material datasheet recommendation. After that, the mixture was degassed under vacuum at 40° C. for 2 h and poured into a glass mould. Then, the mixture was cured at 130° C. for 2 h, 160 for 2 h and 230° C. for 5 h. This sample is denoted as Neat DER 332.

Comparative Example 2

POSS/Epoxy

Commercial Octa-Ammonium POSS (from Hybrid Plastics) was dispersed in ethanol and sonicated for 30 min to improve the filler dispersion in solvent medium. After that, epoxy resin (Epoxy D.E.R. 332) was mixed with the POSS solution and the mixture was homogenized for 30 min. The solvent was removed at 75° C. under vacuum condition after homogenization. After the solvent was completely removed, the hardener (Ethacure 100-LC from Albemarle) was homogeneously mixed with the mixture with weight ratio of 61 g of epoxy resin to 16 g of hardener. After that, the mixture was degassed under vacuum at 40° C. for 2 h, and poured into a glass mould. Then, the mixture was cured at 130° C. for 2 h, 160 for 2 h and 230° C. for 5 h. This sample is denoted as POSS/Epoxy.

Example 3

Comparison

Method of Characterization

High resolution Transmission Electron Microscopy (HR-TEM) micrographs were taken with a Philips CM300 at 300 kV. The samples with a thickness of approximately 100 nm were microtomed at room temperature using a diamond knife and collected on 200 mesh copper grids.

Field Emission Scanning Electron Microscope (FESEM) micrographs were taken using FESEM, JEOL-6700F conducted in high resolution mode with a large objective aperture at 200 kV.

Dynamic Mechanical Analysis: The storage modulus and glass transition temperature (Tg) of the nanocomposite were measured with a TA 2980 dynamic mechanical analyzer using single cantilever mode. The geometry of the specimens is 35 mm (length)×10 mm (width)×3 mm (thickness). Scans were conducted in a temperature range of 30-250° C. at a heating rate of 3° C./min and a frequency of 1 Hz.

Mechanical Property: The flexural modulus was determined by 3-point bending test according to the ASTM Standard D 790-96. The composite was cut to specimen size of 55×13×2.2 mm$^3$. The tests were conducted with cross-head speed of 1.2 mm/min, at a span length of 40 mm. The sample was cut to dog-bone shape for tensile modulus test, according to ASTM D 638-03. The dimension was 55×3.2 to 3.5×2.2 mm$^3$. The test was carried using the Instron 5569 Table Universal testing machine at tensile speed of 1 mm/min.

Impact property: The impact resistance was determined using pendulum-impact tester, according to ASTM Standard D 4812-99.

Comparison

Table 1 shows the mechanical, thermal and impact properties of the studied composite materials. It can be seen that addition of POSS-(PnBA-NH$_2$)$_8$ significantly improves both materials strength (evaluated via the tensile property) and toughness (evaluated via the impact resistance). With only 1 wt % of POSS-(PnBA-NH$_2$)$_8$, the impact resistance, elongation at break and tensile strength increased almost 77%, 110%, and 45%, respectively. The improvement of the nanocomposite strength and toughness is clearly due to the incorporation of POSS-(PnBA-NH$_2$)$_8$ which contains the rigid segment (i.e., POSS) to improve the material strength and the soft-ductile segment (i.e., PnBA) to enhance the material toughness and flexibility.

For comparison purpose, the toughness and strength of a polymer matrix comprising just the commercial available POSS without modification (POSS/Epoxy) was evaluated. Unlike the result with POSS-Rub/Epoxy, the strength of the polymer increased with the POSS filler content (i.e., ↑10% with 1 wt % filler), but the impact resistance significantly decreased (i.e., ↓>50% with 1 wt % filler). In addition, When the POSS content increased by more than 1 wt %, only the nanocomposite strength increased, whereas its toughness reduced significantly. This result indicates that the unmodified POSS solely improves the material strength, but not the material toughness.

The experiment results suggest that the typical filler cannot solve the contradicting problem between material strength and material toughness, but POSS-(PnBA-NH$_2$)$_8$ can solve this challenge by improving material strength as well as material toughness.

TABLE 1

Summary of mechanical, thermal and impact properties of neat epoxy resin, POSS/epoxy and POSS-Rub/epoxy nanocomposite.

| Sample | Filler Content (wt %) | Tensile Property | | | Storage E (MPa) | Impact Resistance (kJm$^2$) | Glass transition temperature, T$_g$ (° C.) | Fracture toughness, K$_{Ic}$ (MPa·m$^{1/2}$) |
|---|---|---|---|---|---|---|---|---|
| | | Max Strength (MPa) | Tensile E (MPa) | Elongation at break (%) | | | | |
| Neat DER 332 | 0 | 48.4 ± 4.19 | 2.4 ± 0.02 | 2.7 ± 0.27 | 2.5 ± 0.17 | 31.16 ± 5.82 | 203.4 ± 0.18 | 1.25 ± 0.08 |
| POSS/Epoxy | 0.5 | 49.0 ± 12.6 (↑ 1%) | 2.4 ± 0.11 | 3.1 ± 1.22 (↑ 15%) | 2.4 ± 0.09 | 16.19 ± 1.68 (↓ 48%) | 199.5 ± 1.12 | 1.25 ± 0.02 |
| | 1 | 54.3 ± 10.4 (↑ 10%) | 2.4 ± 0.05 | 3.0 ± 0.81 (↑ 11%) | 2.5 ± 0.15 | 14.38 ± 3.30 (↓ 54%) | 195.6 ± 0.08 | 1.29 ± 0.88 (↑ 3%) |
| | 1.5 | 59.9 ± 11.9 (↑ 23%) | 3.1 ± 0.33 | 2.3 ± 0.83 (↓ 15%) | 2.8 ± 0.11 | 15.27 ± 1.72 (↓ 51%) | 188.6 ± 1.12 | 1.54 ± 0.13 (↑ 23%) |
| | 2 | 66.8 ± 2.75 (↑ 38%) | 3.3 ± 0.06 | 2.4 ± 0.11 (↓ 11%) | 3.0 ± 0.02 | 10.03 ± 15.79 (↓ 68%) | 145.8 ± 0.93 | 1.65 ± 0.56 (↑ 32%) |
| POSS-Rub/Epoxy | 0.5 | 67.5 ± 8.35 (↑ 39%) | 2.4 ± 0.02 | 4.7 ± 1.22 (↑ 74%) | 2.4 ± 0.13 | 34.96 ± 4.24 (↑ 13%) | 189.1 ± 2.13 | 1.26 ± 0.05 (↑ <1%) |
| | 1 | 69.6 ± 11.6 (↑ 45%) | 2.4 ± 0.05 | 5.7 ± 2.15 (↑ 110%) | 2.5 ± 0.08 | 55.12 ± 3.51 (↑ 77%) | 190.1 ± 1.25 | 1.49 ± 0.03 (↑ 20%) |
| | 1.5 | 74.2 ± 14.5 (↑ 53%) | 2.5 ± 0.07 | 4.9 ± 1.59 (↑ 82%) | 2.4 ± 0.12 | 45.32 ± 4.26 (↑ 45%) | 188.2 ± 0.59 | 1.55 ± 0.54 (↑ 24%) |

TABLE 1-continued

Summary of mechanical, thermal and impact properties of neat epoxy resin, POSS/epoxy and POSS-Rub/epoxy nanocomposite.

| Sample | Filler Content (wt %) | Tensile Property | | | Storage E (MPa) | Impact Resistance (kJm$^2$) | Glass transition temperature, $T_g$ (° C.) | Fracture toughness, $K_{ic}$ (MPa · m$^{1/2}$) |
|---|---|---|---|---|---|---|---|---|
| | | Max Strength (MPa) | Tensile E (MPa) | Elongation at break (%) | | | | |
| | 2 | 68.9 ± 4.33 (↑ 43%) | 2.5 ± 0.01 | 4.2 ± 0.58 (↑ 56%) | 2.4 ± 0.20 | 42.64 ± 2.06 (↑ 37%) | 185.2 ± 0.58 | 1.63 ± 0.11 (↑ 30%) |

Note:
E = modulus

INDUSTRIAL APPLICABILITY

The composite material may be useful as a filler in a polymer matrix to improve both the material strength and material toughness at the same time. The composite material may be useful as an alternative filler for polymers.

The polymer comprising the composite material may be useful in paints, coatings and adhesives. The polymer comprising the composite material may be useful in structural composite materials. The polymer comprising the composite material may also be useful in structural components in industrial tooling, infrastructure, electronics, automotive, marine, aerospace, off-shore and biological applications. The polymer comprising the composite may be further useful in sporting goods and in packaging materials. The method for manufacturing the composite material may be useful in time- and cost-effective manufacture of the composite material.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A composite material comprising a core and an amine functionalized elastomeric polymer bonded onto the core, wherein the core comprises octahedral oligomeric silsesquioxane, and wherein the elastomeric polymer is poly(n-butylacrylate), and
    wherein the composite material is obtained by:
        providing a core comprising octa(3-hydroxy-3-methylbutyldimethylsiloxy)-POSS;
        activating the core by converting the hydroxyl group of octa(3-hydroxy-3-methylbutyldimethylsiloxy)-POSS to a bromo group;
        contacting the activated core comprising octabromopropionyl polyoctahedral silsesquioxane with an elastomeric polymer of poly(n-butylacrylate), and
        functionalizing the elastomeric polymer with a reactive functional group.

2. The composite material according to claim 1, wherein the functionalized elastomeric polymer is covalently bonded onto the core.

3. A polymer comprising a resin and a composite material comprising a core and an amine functionalized elastomeric polymer bonded onto the core, wherein the core comprises octahedral oligomeric silsesquioxane, and wherein the elastomeric polymer is poly(n-butylacrylate),
    wherein the composite material is obtained by:
        providing a core comprising octa(3-hydroxy-3-methylbutyldimethylsiloxy)-POSS;
        activating the core by converting the hydroxyl group of octa(3-hydroxy-3-methylbutyldimethylsiloxy)-POSS to a bromo group;
        contacting the activated core comprising octabromopropionyl polyoctahedral silsesquioxane with an elastomeric polymer of poly(n-butylacrylate), and
        functionalizing the elastomeric polymer with a reactive functional group.

4. The polymer according to claim 3, wherein the composite material is present in the polymer in an amount of up to 40 wt % or in the range of 0.1 wt % to 15 wt %.

5. The polymer according to claim 3, wherein the resin comprises polymerizable groups selected from the group consisting of amine, epoxy, ester, hydroxyl, vinyl, urethane, isocyanate and any mixture thereof or wherein the resin comprises epoxy groups.

6. The polymer according to claim 3, wherein the resin is bisphenol A diglycidylether.

7. A method of synthesizing a composite material comprising a core and an amine functionalized elastomeric polymer bonded onto the core, wherein the elastomeric polymer is a thermoset elastomer, comprising:
    providing a core comprising octa(3-hydroxy-3-methylbutyldimethylsiloxy)-POSS;
    activating the core by converting the hydroxyl group of octa(3-hydroxy-3-methylbutyldimethylsiloxy)-POSS to a bromo group;
    contacting the activated core comprising octabromopropionyl polyoctahedral silsesquioxane with an elastomeric polymer of poly(n-butylacrylate), and
    functionalizing the elastomeric polymer with a reactive amine functional group.

8. The method according to claim 7, wherein the contacting step is performed in the presence of a base.

9. The method according to claim 7, wherein the contacting step forms a covalent bond between the activated core and the elastomeric polymer.

10. The method according to claim 7, wherein the functionalizing operation is performed by contacting the elastomeric polymer with cysteamine.

* * * * *